(12) United States Patent
LaFuente et al.

(10) Patent No.: US 10,935,994 B2
(45) Date of Patent: Mar. 2, 2021

(54) TIME FAULT CIRCUIT INTERRUPTER

(71) Applicants: Kevin L LaFuente, Alger, MI (US); Salvatore Tringali, Washington Township, MI (US)

(72) Inventors: Kevin L LaFuente, Alger, MI (US); Salvatore Tringali, Washington Township, MI (US)

( * ) Notice: Subject to any disclaimer, the term of this patent is extended or adjusted under 35 U.S.C. 154(b) by 0 days.

(21) Appl. No.: 15/715,691

(22) Filed: Sep. 26, 2017

(65) Prior Publication Data

US 2019/0094891 A1 Mar. 28, 2019

(51) Int. Cl.
*G05D 7/06* (2006.01)
*G05B 15/02* (2006.01)
*H02H 1/00* (2006.01)
*H02H 3/093* (2006.01)

(52) U.S. Cl.
CPC ........... *G05D 7/0629* (2013.01); *G05B 15/02* (2013.01); *H02H 1/0007* (2013.01); *H02H 3/0935* (2013.01); *H02H 1/0092* (2013.01)

(58) Field of Classification Search
CPC .. G05D 7/0629; H02H 1/0007; H02H 1/0092; G05B 15/02
See application file for complete search history.

(56) References Cited

U.S. PATENT DOCUMENTS

| 4,854,164 A * | 8/1989 | Rhoads | E21B 47/10 73/152.29 |
|---|---|---|---|
| 4,998,097 A | 3/1991 | Noth et al. | |
| 5,205,316 A | 4/1993 | Pruett | |
| 5,237,310 A | 8/1993 | Smith | |
| 5,577,890 A | 11/1996 | Nielsen et al. | |
| 5,627,713 A * | 5/1997 | Takeshi | H02H 3/006 361/67 |
| 6,802,084 B2 | 10/2004 | Ghertner et al. | |
| 8,095,233 B1 * | 1/2012 | Shankar | H02J 13/00004 700/148 |
| 8,134,372 B2 * | 3/2012 | King | F04B 49/10 324/511 |
| 9,316,216 B1 | 4/2016 | Cook et al. | |
| 2004/0071554 A1 * | 4/2004 | Nybo | F04D 15/029 417/36 |
| 2004/0261167 A1 * | 12/2004 | Panopoulos | E04H 4/1654 4/490 |
| 2005/0047045 A1 * | 3/2005 | Puskar | H02H 3/006 361/115 |
| 2006/0221521 A1 * | 10/2006 | Veroni | H02H 3/0935 361/78 |
| 2007/0146945 A1 * | 6/2007 | Zhang | H02H 3/335 361/42 |

(Continued)

*Primary Examiner* — Jared Fureman
*Assistant Examiner* — Emmanuel Dominique
(74) *Attorney, Agent, or Firm* — Fishman Stewart PLLC

(57) ABSTRACT

An exemplary time fault circuit interrupter for interrupting a power supply to an equipment unit upon the occurrence of a trip condition may include a sensor configured to monitor a current flow to the equipment unit. The circuit interrupter may also include a trip mechanism configured to interrupt the current flow. The circuit interrupter may further include a processor in communication with the sensor and the trip mechanism, and the processor may be configured to cause the trip mechanism to interrupt the current flow when a current flow time has reached a predetermined time limit.

17 Claims, 10 Drawing Sheets

(56) References Cited

U.S. PATENT DOCUMENTS

| | | | |
|---|---|---|---|
| 2009/0115424 A1* | 5/2009 | King | F04B 49/10 |
| | | | 324/511 |
| 2015/0109077 A1* | 4/2015 | Tomimbang | H02H 1/0015 |
| | | | 335/7 |
| 2016/0225562 A1* | 8/2016 | Franks | H02H 3/006 |
| 2016/0231721 A1* | 8/2016 | Lakshmanan | H01H 71/00 |
| 2018/0374664 A1* | 12/2018 | Garcia Ban s | H01H 35/2678 |
| 2019/0082629 A1* | 3/2019 | Montgomery | A01G 25/16 |

\* cited by examiner

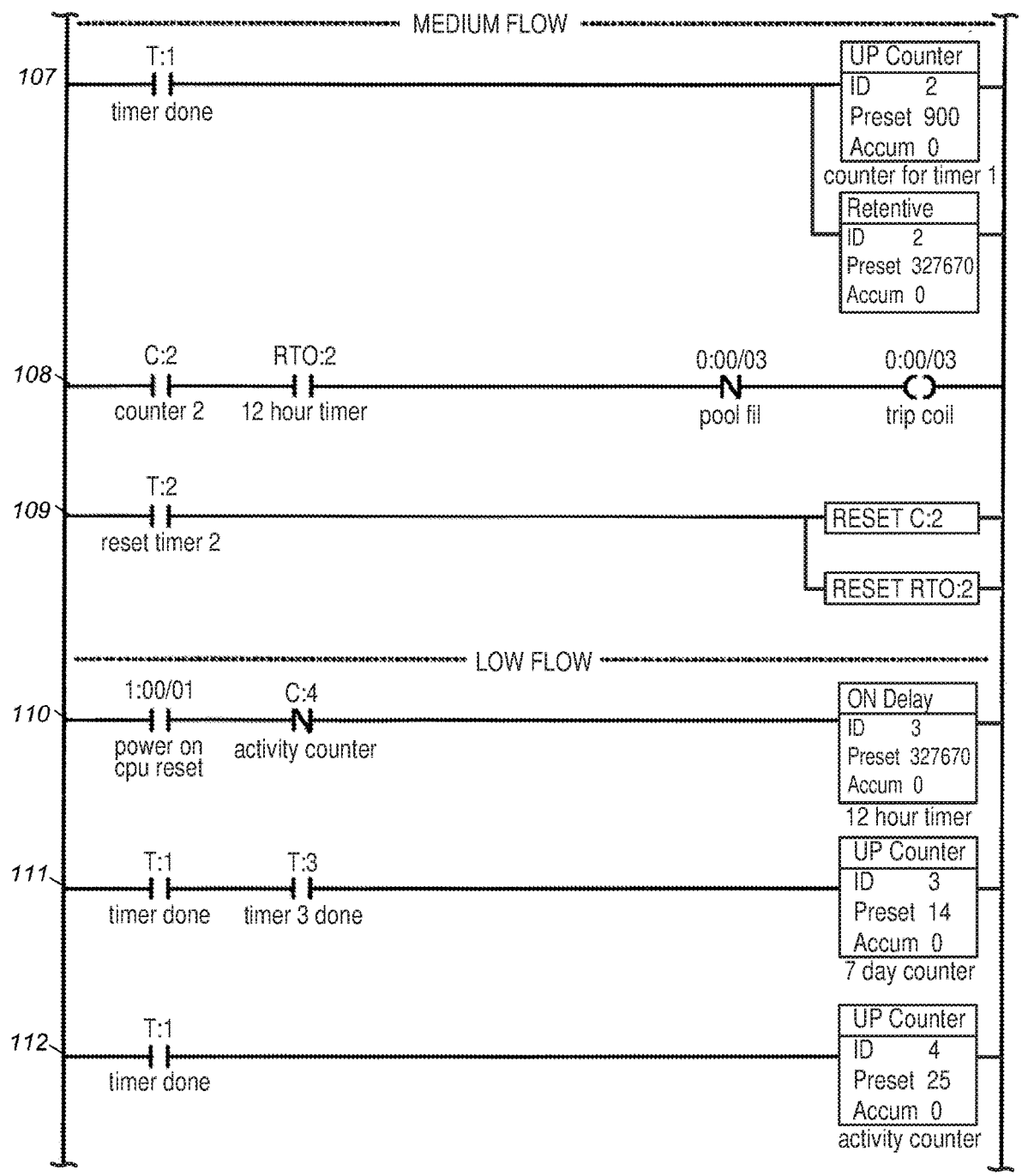
(Continued on FIG. 5C)  FIG. 5B

TIME FAULT CIRCUIT INTERRUPTER

FIELD OF TECHNOLOGY

The present disclosure pertains to a time fault circuit interrupter for interrupting a power supply to an equipment unit, including, but not limited to, a pump, based on a current flow time.

BACKGROUND

Water damage is a problem encountered by homes every year, and can range from insignificant to quite severe. Thus, the costs for homeowners and/or insurance companies to repair such damage can be extremely high. Water damage can be caused by many different factors. One such factor could be the operation of a piece of equipment, such as a pump, for longer than is needed. For example, a well pump that is left operating can ultimately flood a home. In addition, other types of equipment, including, but not limited to, pumps, air compressors, and the like, that are left operating can potentially cause other kinds of damage and/or have their motors or other components fail due to longer-than-necessary operation.

Accordingly, there exists a need for a device, system, and/or method to monitor and/or control the length of power supply to equipment to minimize or prevent unwanted operation of said equipment and the potential damage to the home and/or equipment that may result therefrom.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

FIGS. 5A-5D is a schematic, ladder logic diagram for operating the system of FIG. 1 under different conditions according to one exemplary approach;

DETAILED DESCRIPTION

A time fault circuit interrupter may be provided to interrupt a power supply to an equipment unit, for example, a pump, upon the occurrence of a trip condition, to provide unwanted operation of the equipment that may potentially cause damage to the equipment unit and/or the home in which it is installed, for example, flooding of the home. An exemplary time fault circuit interrupter may include a sensor configured to monitor a current flow to the equipment unit. The time fault circuit interrupter may also include a trip mechanism configured to interrupt the current flow. The time fault circuit interrupter may further include a processor in communication with the sensor and the trip mechanism, and the processor may be configured to cause the trip mechanism to interrupt the current flow when a current flow time has reached a predetermined time limit. The time fault circuit interrupter may be incorporated in a system with a power distributor.

An exemplary method for interrupting a power supply to an equipment unit may include monitoring, by a processor, a current flow to the equipment unit. The method may also include tracking, by a processor, a current flow time that the current flow is being supplied to the equipment unit. The method may further include interrupting, by a trip mechanism, when the current flow time has reached a predetermined time limit.

Figure 1:
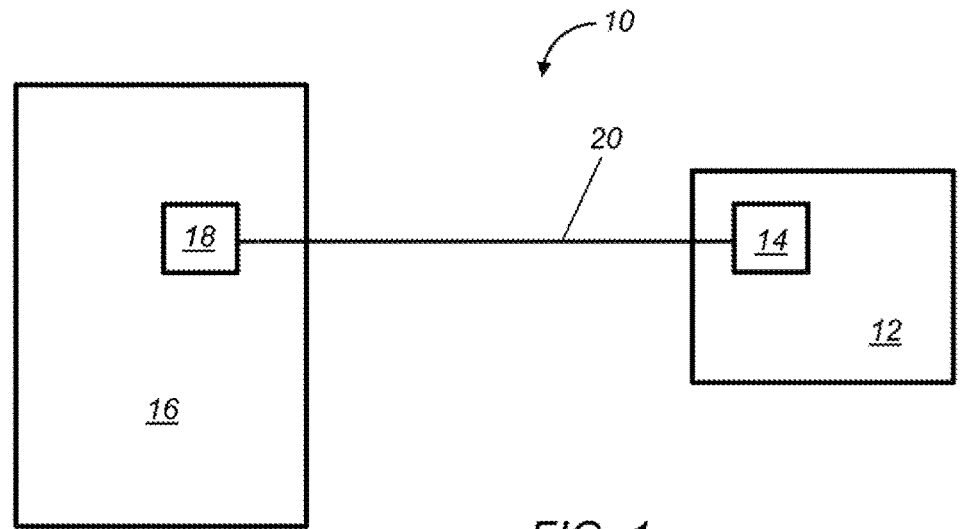
FIG. 1 is a schematic block diagram of an exemplary system for monitoring and/or controlling power supply to an equipment unit.

Referring now to the figures, FIG. 1 illustrates a block diagram of an exemplary system 10 for controlling and/or monitoring power supply to an equipment unit 12. The equipment unit 12 may include a motor 14 that may receive a current flow, and may be or may include, but is not limited to, well pumps, air compressors, industrial pumps, fuel delivery systems, and the like. The system 10 may include a power distributor 16 configured to supply power to the equipment unit 12. The power distributor 16 may be, but is not limited to, an electrical distribution board or panel, a receptacle, or the like. The power distributor 16 may have a time fault circuit interrupter 18 configured to interrupt the power supply to the equipment unit 12 under certain conditions. For example, the condition may be a set time duration that the power supply is to be maintained to the equipment unit 12, as described in more detail hereinafter. While FIG. 1 illustrates the power distributor 16 as having only one time fault circuit interrupter 18, it should be appreciated that there may be any number of time fault circuit interrupters 18, either alone or in combination. In addition, it should be appreciated that the power distributor 16 may have any number of other components not shown but that are known in the art, including, but not limited to, circuit breakers, switches, wires, ground bars, neutral bars, and the like.

Figure 2:
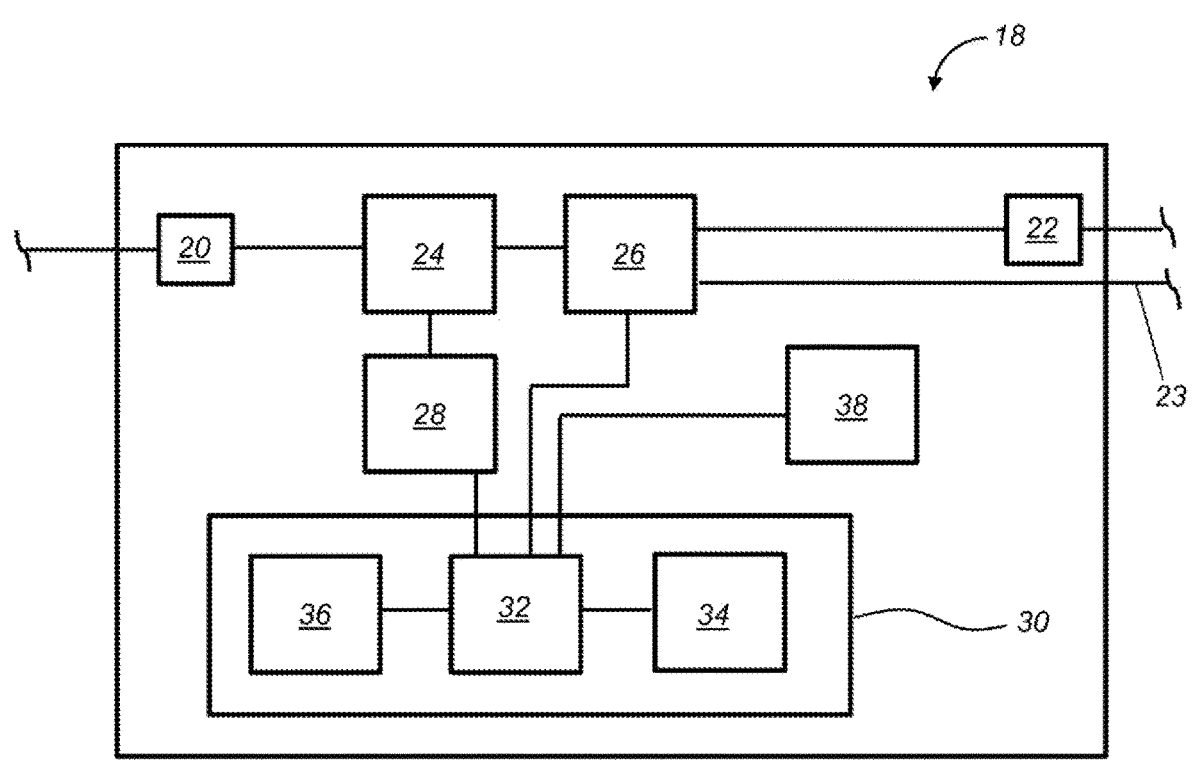
FIG. 2 is a schematic block diagram of an exemplary time fault circuit interrupter of the system of FIG. 1.
Figure 3:
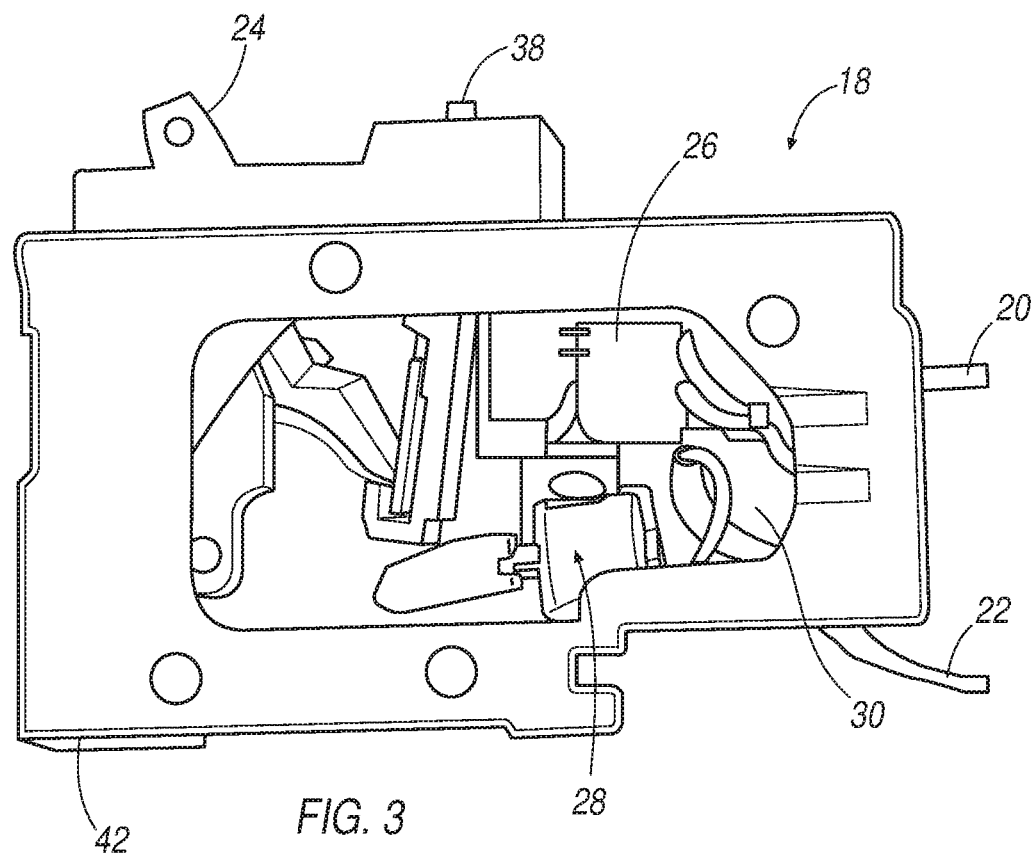
FIG. 3 is a schematic side view of an exemplary time fault circuit interrupter of the system of FIG. 1.
Figure 4:
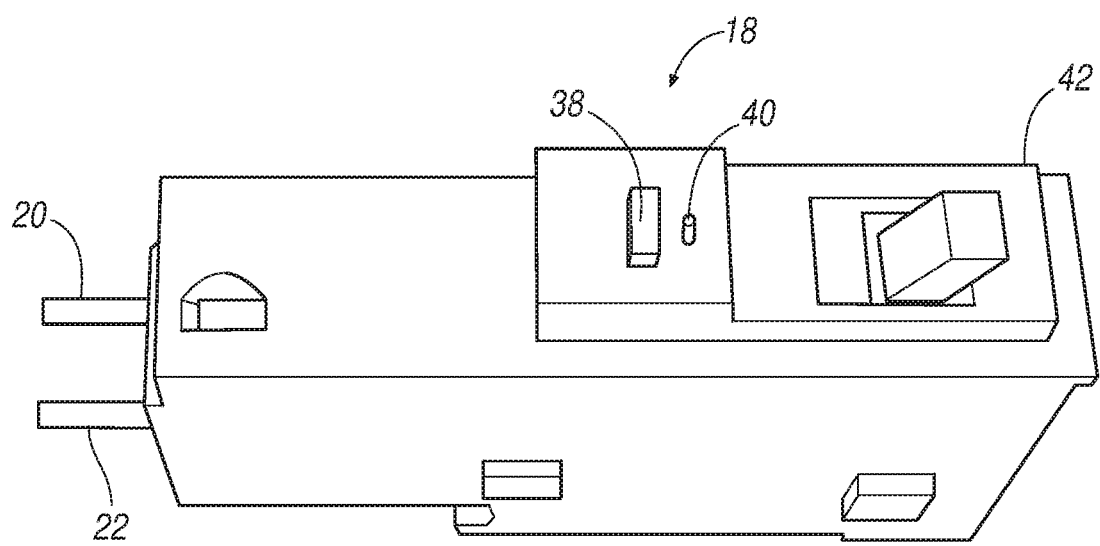
FIG. 4 is a schematic perspective view of the exemplary time fault circuit interrupter of FIG. 3.
Figure 5A:
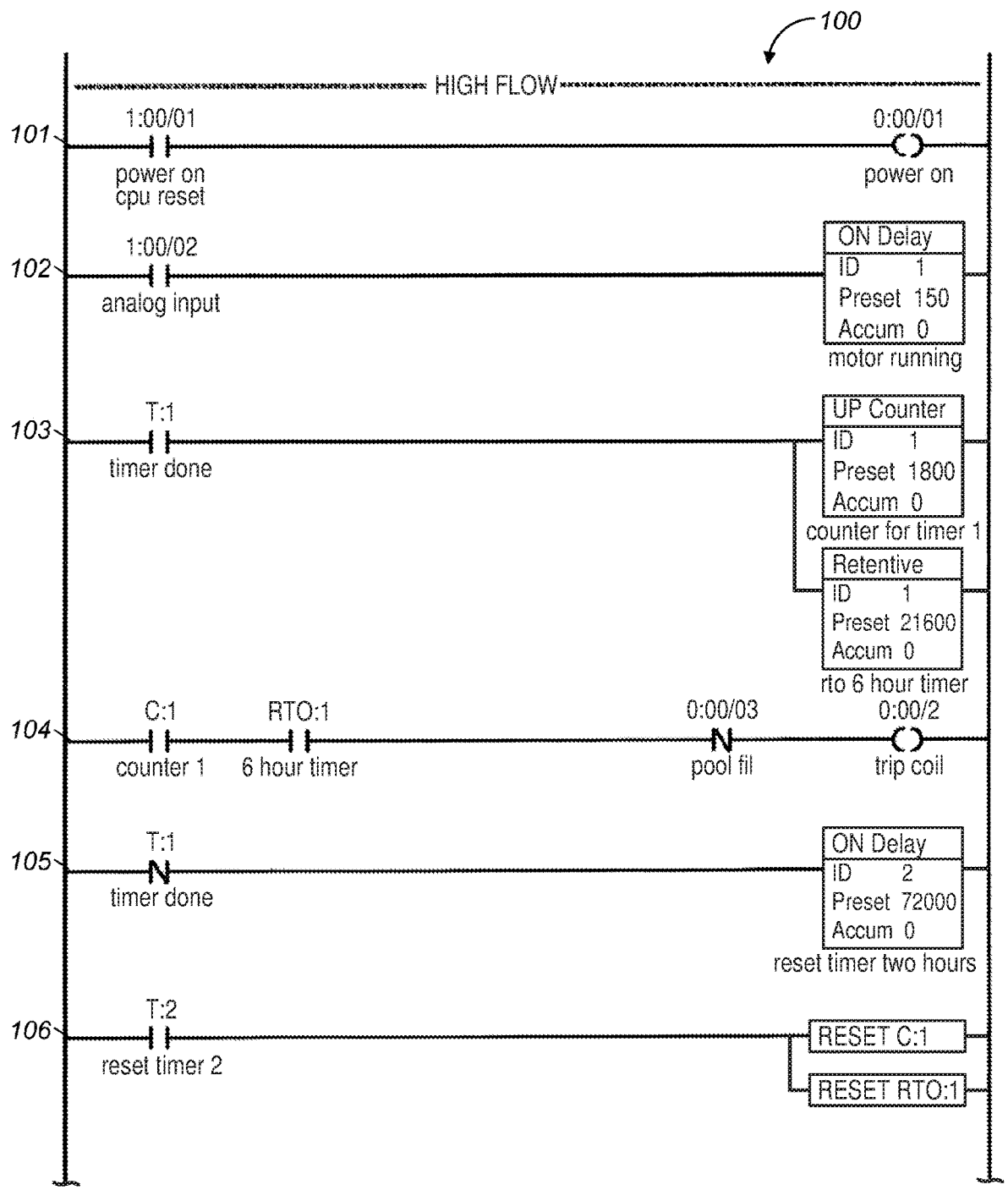
Figure 5C:
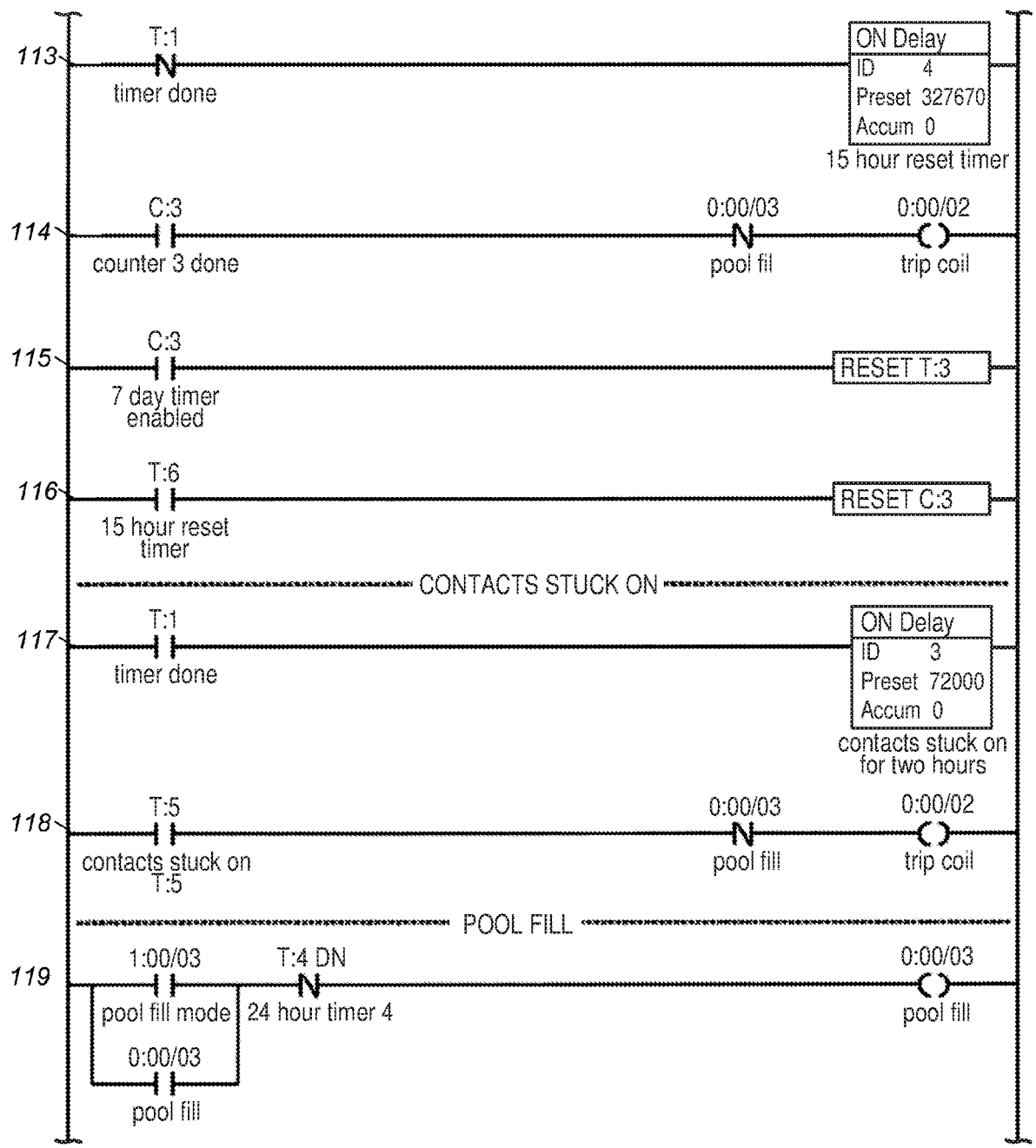
Figure 5D:
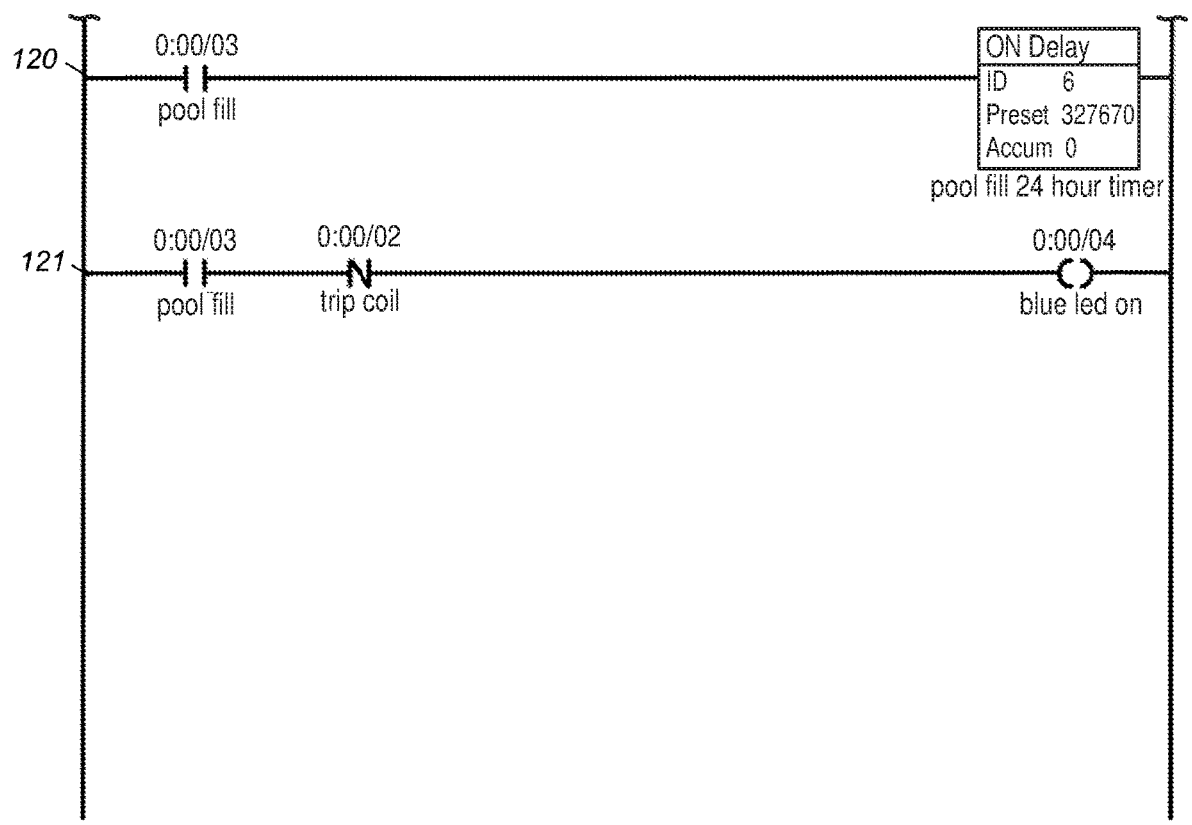
Figure 6A:
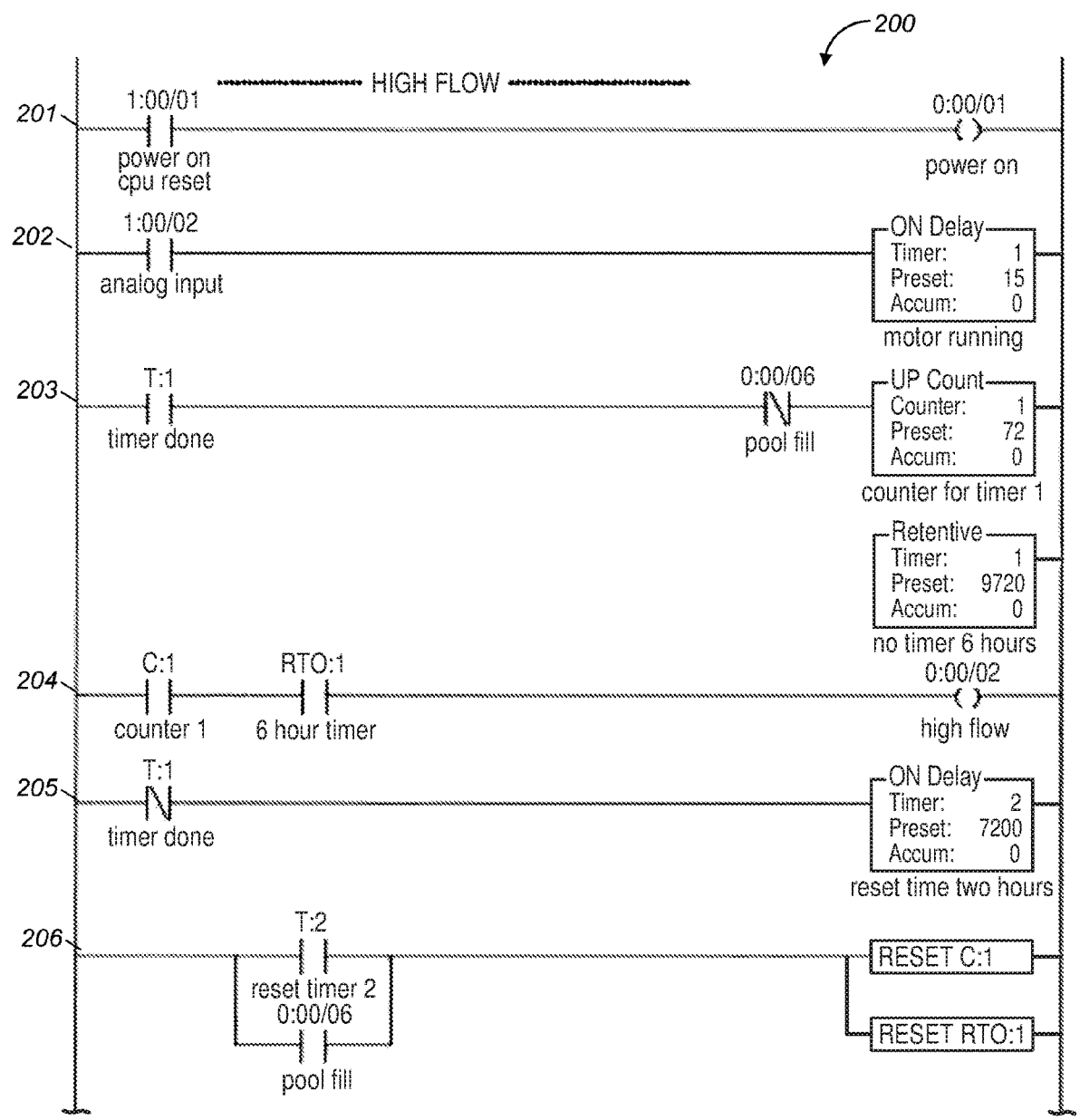
FIGS. 6A-6D are schematic ladder logic diagrams for operating the system of FIG. 1 under different conditions according to another exemplary approach.
Figure 6B:
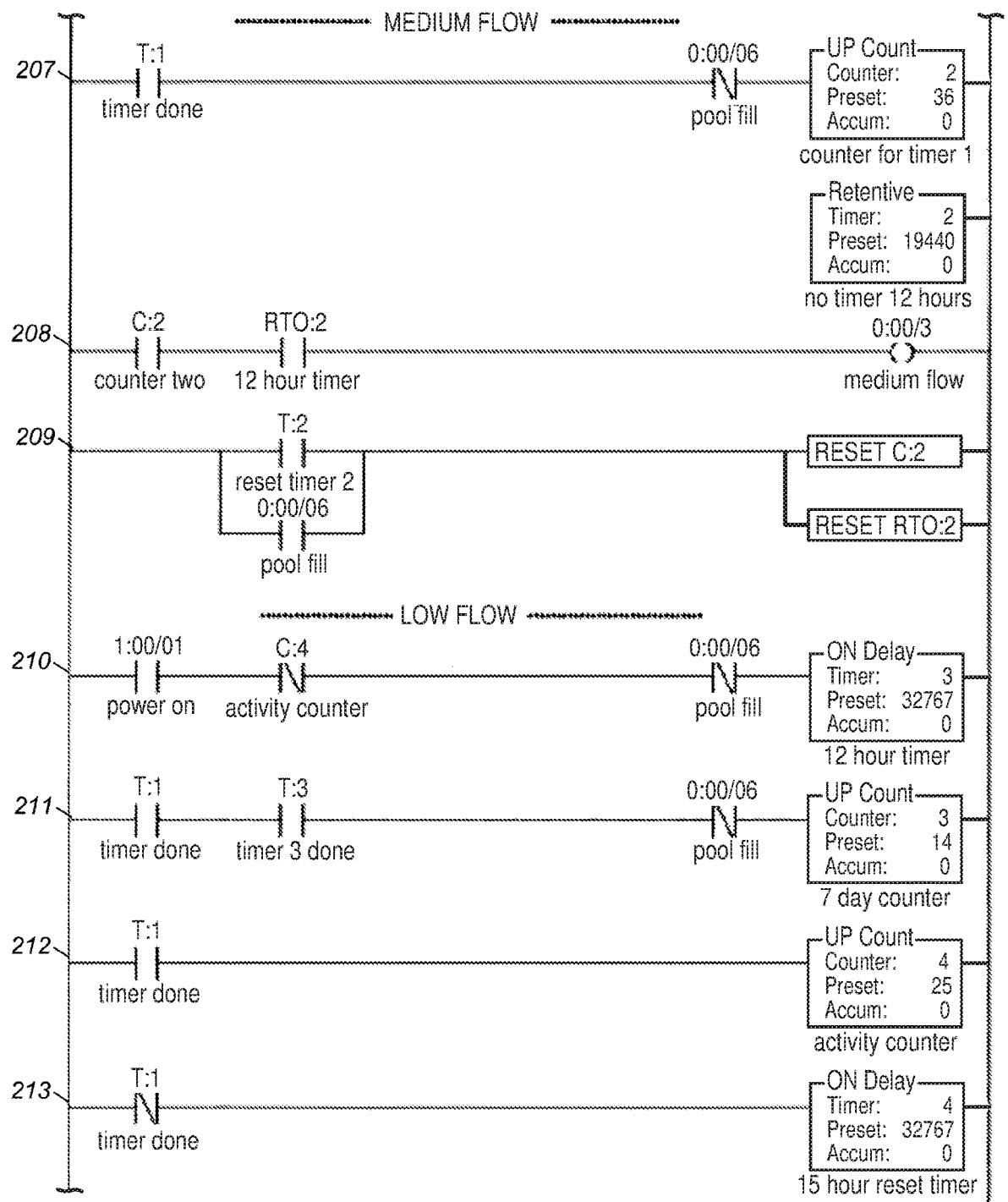
Figure 6C:
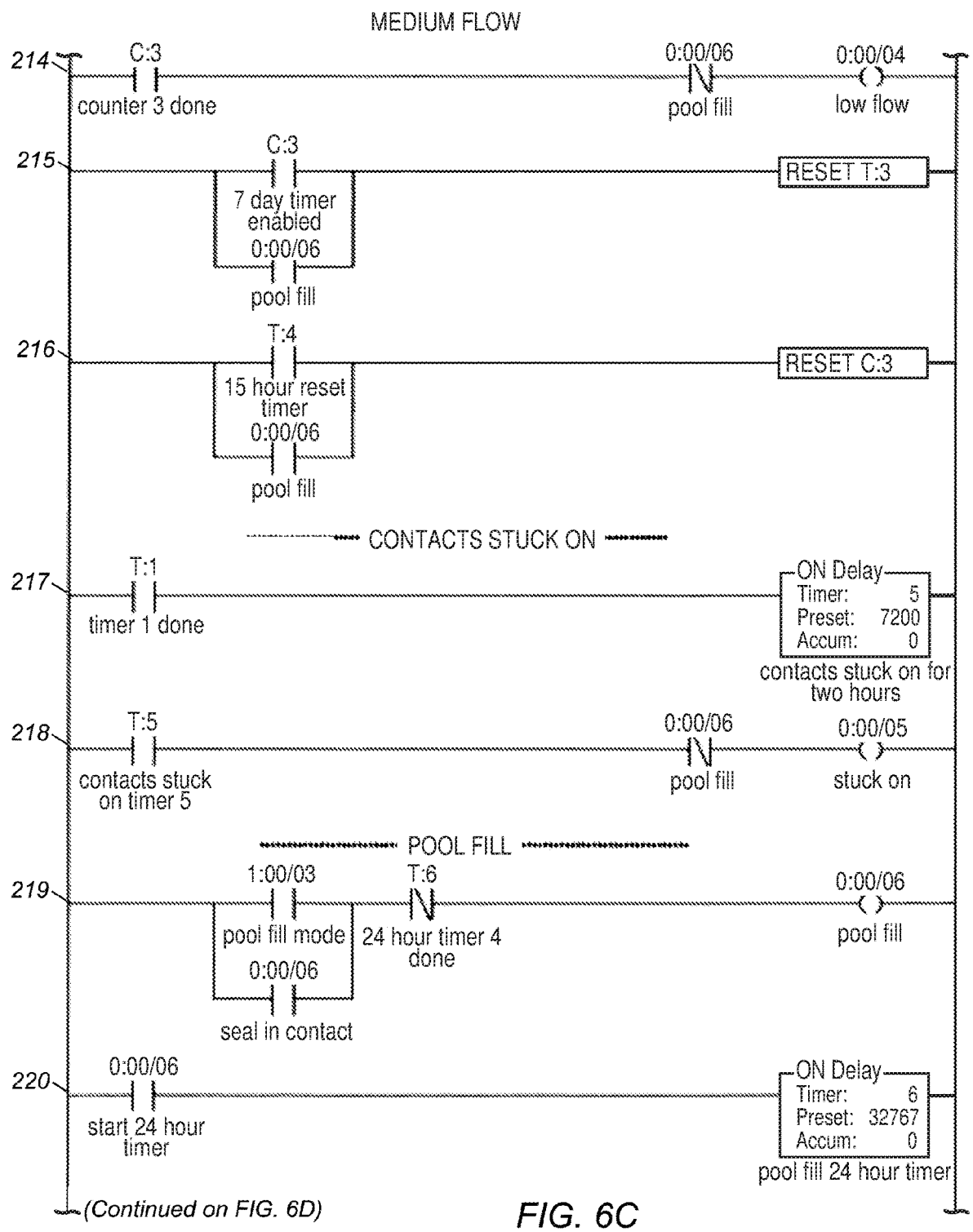
Figure 6D:
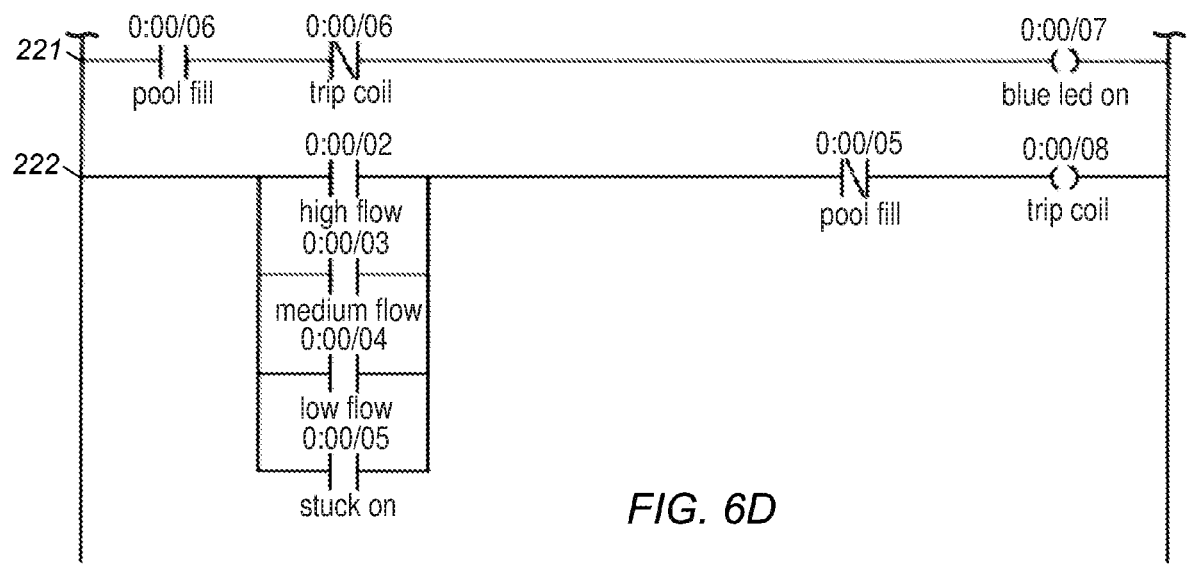

Referring now to FIGS. 2-4, an exemplary time fault circuit interrupter 18 is illustrated. While FIGS. 3 and 4 illustrate the time fault circuit interrupter 18 as being embodied as a circuit breaker, which may be incorporated in an electrical distribution board, it should be appreciated that the time fault circuit interrupter 18 may be incorporated in any power distribution system, device, or apparatus, including, but not limited to, a receptacle. The time fault circuit interrupter 18 may be operable with standard utility supplied power, including, but not limited to, 120 volts to ground, 240 volts single phase, 240 volts three phase, and 480 volts three phase. Further, the time fault circuit interrupter 18 may have standard current sizing, including, but not limited to, 15 amp, 20 amp, 30 amp, 40 amp, 50 amp, 60 amp, 70 amp, 100 amp, 125 amp, 150 amp, 175 amp, and 200 amp.

The time fault circuit interrupter 18 may include a line terminal 20 by which the time fault circuit interrupter 18 may receive a current flow from a current or power source, e.g., the power distributor 16, at least one load terminal 22 by which the time fault circuit interrupter 18 may supply the current flow to the equipment unit 12, and a neutral wire 23 that may lead to a neutral bar of a distribution board. The time fault circuit interrupter 18 may also include a switch 24 configured to selectively open and close the supply of the current flow. The circuit interrupter 18 may further include a sensor 26 and a trip mechanism 28. The sensor 26 generally may be configured to monitor the current flow to the equipment unit 12, and may be, but is not limited to, an induction coil 26. The trip mechanism 28 generally may be configured to interrupt the current flow by tripping the circuit upon the occurrence of a trip condition, e.g., the time duration that the current flow is being supplied (the current flow time) reaches a predetermined time limit, and may be, but is not limited to, a trip coil.

The time fault circuit interrupter 18 may further include a circuit board 30 with at least one processor 32 and at least one memory 34. The processor 32 may be in communication with the sensor 26 and the trip mechanism 28. The processor 32 may receive a signal or other indication from the sensor 26 that current flow is being supplied to the equipment unit 12. When the processor 32 determines that the current flow time, has been supplied has reached a predetermined time limit, the processor 32 may be configured to send a command signal to the trip mechanism 28 or otherwise cause the trip mechanism 28 to interrupt the current flow by tripping the circuit. The time fault circuit interrupter 18 may include at least one timer 36 in communication with the processor 32. When the processor 32 receives a signal from the sensor 26 that current flow is being supplied to the equipment unit 12, the processor 32 may command the timer 36 to begin tracking or measuring the current flow time until the predetermined time limit has been reached. While FIG. 2 illustrates the timer 36 as being part of or on the circuit board 30, it should be appreciated that the timer 36 may be located elsewhere in a housing 42 of the time fault circuit interrupter 18 in which or on which the components may be located.

In embodiments in which the equipment unit 12 is a pump used to fill a pool, the time fault circuit interrupter 18 may further include a pool fill mode selector 38, which may be, but is not limited to, a push button. When activated, the selector 38 may engage contacts, causing a signal to be generated and sent to the processor 32 such that the processor 32 knows that the pump is operating in a pool fill mode. Thus, the processor 32 may retrieve from the memory 34 and run the logic program associated with the pool fill mode. Activation of the selector 38 may further activate an indicator 40 that may provide an indication to a user that the equipment 12 is in the pool fill mode. The indicator 40 may be visual and/or auditory, and may include, but is not limited to, a light emitting diode.

The memory 34 may have stored on it one or more logic programs by which the processor 32 may determine if the predetermined time limit has been reached, and therefore if the circuit and current flow should be interrupted. The logic program(s) may be specific to the type of equipment unit 12 to which the current flow is being supplied. The predetermined time limit may be included in the logic program, and may be dependent upon at least one condition and/or operating mode of the equipment unit 12. For example, where the equipment unit 12 is a pump, such as a well pump, the conditions may include one or more of a low water flow condition, a medium water flow condition, a high water flow condition, and a pool fill mode between which the predetermined time limit may differ. The condition may also be that contacts of the equipment unit 12 are stuck on. Exemplary ladder logic diagrams are illustrated in FIGS. 6A-7E, and are described in more detail hereinafter.

Processor 32 may include a microprocessor. Processor 32 may receive instructions from memories such as memory 34, and execute the instructions, thereby performing one or more operations or processes including those described herein. Such instructions may be stored and transmitted using a variety of computer-readable mediums (e.g., memory 34). Processors such as processor 32 may include any computer hardware or combination of computer hardware that is configured to accomplish the purpose of the devices, systems, and processes described herein. For example, the processor 32 may be any one of, but not limited to single, dual, triple, or quad core microprocessors (on one single chip), graphics processing devices, visual processing devices, and virtual processors.

Memories such as memory 34 may include, in general, any computer-readable medium (also referred to as a processor-readable medium) that may include any non-transitory (e.g., tangible) medium that participates in providing medication information or instructions that may be read by a computer (e.g., by processor 32). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Referring now to FIGS. 5A-5D, a ladder logic diagram 100 for operating system 10 under different conditions (e.g., high water flow, medium water flow, low water flow, contacts stuck on, and pool fill mode) is illustrated according to one exemplary approach. Ladder logic diagram 100 may include a plurality of "rungs", the operations for which are described below for the different conditions. It should be appreciated that any of the logic programs stored in the memory 34 and operated by the processor 32 may include more or less of the conditions. It should further be appreciated that any of the time intervals and durations described with ladder logic diagram 100 are for exemplary purposes only, and may be adjustable.

High Flow

Rung 101: Power on/reset (I:00/01) set, energize power on (O:00/01).

Rung 102: Continuously monitor, via an induction coil (A:1), the AC current of the output circuit to an analog input circuit (A:2). When AC current is detected, the analog input circuit (A:2) sends an equal statement and sets input (I:00/02). On Delay Timer Two (T:2) sets after an approximate fifteen second preset expires.

Rung 103: With On Delay Timer One (T:1) set, Counter One (C:1) counts up once every time On Delay Timer Two (T:2) toggles on and off until a preset of approximately 1800 seconds expires. At the same time Retentive Timer One (RTO:1) sets after an approximate six hour preset expires.

Rung 104: With Counter One (C:1) set, Retentive Timer (RTO:1) set and Pool Fill (O:00/03) not set, energize Trip Coil (O:00/02).

Rung 105: With On Delay Timer (T:1) not set, set On Delay Timer Two (T:2). On Delay Timer Two (T:2) sets after an approximate two hour preset expires.

Rung 106: With On Delay Timer Two (T:2) set, reset Counter Two (C:2) and Retentive Timer One (RTO:1).

Medium Flow

Rung 107: With On Delay Timer One (T:1) set, Counter Two (C:2) counts up once every time On Delay Timer One (T:1) toggles on and off until a preset of approximately 900 seconds expires. At the same time, Retentive Timer One (RTO:1) sets after an approximate twelve hour preset expires.

Rung 108: With Counter Two (C:2) set, Retentive Timer Two (RTO:2) set, and Pool Fill (O:00/03) not set, energize Trip Coil (O:00/02).

Rung 109: With On Delay Timer Two (T:2) set, reset Counter Two (C:2) and Retentive Timer Two (RTO:2).

Low Flow

Rung 110: With power on and Counter (C:4) not set, On Delay Timer (T:3) sets after an approximately twelve hour preset expires.

Rung 111: With On Delay Timer One (T:1) set and On Delay Timer Three (T:3) set, then Counter Three (C:3) counts up one and sets after preset expires.

Rung 112: With On Delay Timer One (T:1) set, Counter Four (C:4) counts up one and sets after preset expires.

Rung 113: With O Delay Timer One (T:1) not set, On Delay Timer Four (T:4) sets after an approximately fifteen hour preset expires.

Rung 114: With Counter Three (C:3) set and Pool Fill (O:00/03) not set, energize Trip Coil (O:00/02).

Rung 115: With Counter Three (C:3) enabled, reset On Delay Timer Three (T:3)

Rung 116: With On Delay Timer Six (T:6) set, reset Counter Three (C:3)

Contacts Stuck On

Rung 117: With On Delay Timer One (T:1) set, On Delay Timer Five (T:5) sets after an approximate two hour preset expires Rung 118: With On Delay Timer Five (T:5) set and Pool Fill (O:00/03) not set, energize Trip Coil (O:00/02).

Pool Fill

Rung 119: With Momentary Pushbutton (I:00/03) set, and Timer Four (T:4) not set, energize Pool Fill (O:00/03).

Rung 120: With Pool Fill (O:00/03) set, On Delay Timer Six (T:6) sets after an approximate twenty four hour preset expires.

Rung 121: With Pool Fill (O:00/03) set, and Trip Coil (O:00/02) not set, energize (0:00/03) LED on.

Referring now to FIGS. 6A-6D, a ladder logic diagram 200 for operating system 10 under different conditions (e.g., high water flow, medium water flow, low water flow, contacts stuck on, and pool fill mode) is illustrated according to another exemplary approach. Ladder logic diagram 200 generally may include rungs 201-222, where any one of rungs 201-221 may be similar in programming and/or operation as a corresponding rung 101-121 in ladder logic diagram 100. In ladder logic diagram 200, each condition may have its own output, as illustrated in rungs 204, 208, 214, 218, and 219. In addition, rungs 206, 209, 215, and 216 may include the Pool Fill being set, though it should be appreciated that more or less rungs may include this logic. Further, at rung 222, with any of the High Flow, Medium Flow, Low Flow, or Contacts Stuck On conditions set and the Pool Fill not set, the Trip Coil output may be energized. It should be appreciated that any of the logic programs stored in the memory 34 and operated by the processor 32 may include more or less of the conditions. It should also be appreciated that any of the time intervals and durations described with ladder logic diagram 200 are for exemplary purposes only, and may be adjustable. It should further be appreciated that any combination of rungs between ladder logic diagrams 100 and 200 capable of achieving and performing method 300, described below, and/or operating system 10 is contemplated.

Figure 7:
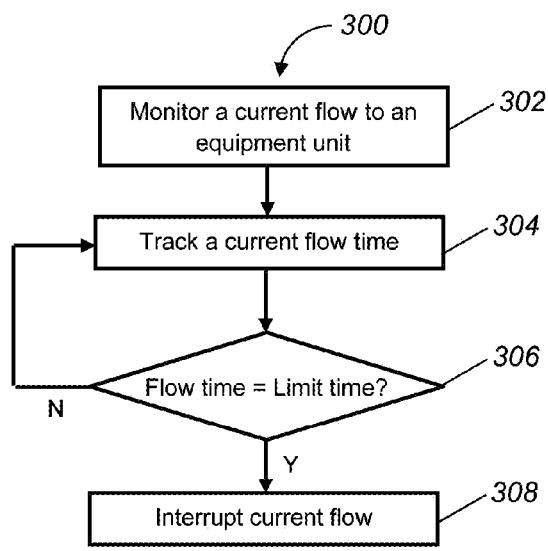
FIG. 7 is a schematic flow diagram of an exemplary method for operation of the system of FIG. 1.

Referring now to FIG. 7, an exemplary method 300 for interrupting a power supply to an equipment unit, such as equipment unit 12, upon the occurrence of a trip condition is illustrated. As explained above, the trip condition generally may be when a current flow has been supplied for a predetermined time limit. While method 300 is described with respect to system 10, and in particular, time fault circuit interrupter 18, it should be appreciated that any system and/or device capable of performing the steps of method 100 is contemplated. Method 300 begins just after a current flow to the equipment unit 12 begins. At step 302, the sensor 26 may continuously monitor the current flow, and continuously send a signal to the processor 32 while the current flow is maintained. At step 304, the processor 32 may track the current flow time by initiating a timer 36 when the processor 32 first receives a signal from the sensor 26 that the current flow is active. At step 306, the processor 32 may determine if the current flow time has reached a predetermined time limit, as determined based on one or more of the logic programs stored in the memory 34. If the predetermined time limit has been reached, then method 300 may proceed to step 308 at which the processor 32 may cause (or energize) the trip mechanism 28 to interrupt the current flow (e.g., trip the circuit).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A time fault circuit interrupter comprising:
a sensor configured to monitor a current flow to an equipment unit;
a trip mechanism configured to interrupt the current flow;

a processor in communication with the sensor and the trip mechanism, the processor being configured to cause the trip mechanism to interrupt the current flow when a current flow time has reached a predetermined time limit;

a memory in communication with the processor and on which logic programs associated with at least a low flow condition and a high flow condition are stored; and a housing in or on which the sensor, the trip mechanism, and the processor are disposed;

wherein the housing is in the form of a circuit breaker configured to fit within a circuit breaker panel;

wherein the equipment unit is a pump; and wherein the value of the predetermined time limit in the high flow condition is higher than in the low flow condition.

2. The time fault circuit interrupter of claim 1, wherein the sensor includes an induction coil, and the trip mechanism includes a trip coil.

3. The time fault circuit interrupter of claim 1, further comprising a switch configured to open and close the current flow to the equipment unit.

4. The time fault circuit interrupter of claim 1, further comprising at least one timer in communication with the processor, the at least one timer being configured to measure the current flow time and send the measurement to the processor.

5. The time fault circuit interrupter of claim 4, wherein the timer includes at least one of a pneumatic timer, a digital timer, an analog timer, and a pulse timer.

6. The time fault circuit interrupter of claim 1, wherein the logic programs are further associated with at least one of a medium flow condition and a pool fill mode, where the value of the predetermined time limit in the medium flow condition is higher than in the low flow condition, the value of the predetermined time limit in the high water flow condition is higher than in the medium flow condition, and the value of the predetermined time limit in the pool fill mode is higher than in the high flow condition.

7. The time fault circuit interrupter of claim 1, further comprising a pool fill mode selector that, when activated, communicates to the processor that the equipment unit is being run in a pool fill mode.

8. The time fault circuit interrupter of claim 1, further comprising an indicator providing an indication that a pool fill mode is activated.

9. The time fault circuit interrupter of claim 8, wherein the indicator is a light-emitting diode.

10. The method of claim 1, wherein the sensor includes an induction coil, and the trip mechanism includes a trip coil.

11. The time fault circuit interrupter of claim 1, wherein the logic programs are further associated with a condition indicative of contacts of the equipment unit being stuck on.

12. The time fault circuit interrupter of claim 1, wherein the logic programs include ladder logic programming.

13. A system comprising a power distributor configured to distribute power to at least one equipment unit, the power distributor having at least one time fault circuit interrupter including:

a sensor configured to monitor a current flow to an equipment unit;

a trip mechanism configured to interrupt the current flow;

a processor in communication with the sensor and the trip mechanism, the processor being configured to cause the trip mechanism to interrupt the current flow when a current flow time has reached a predetermined time limit;

a memory in communication with the processor and on which logic programs associated with at least a low flow condition, a medium flow condition, and a high flow condition are stored; and a housing, two or more of the following are be disposed in the housing: the sensor, the trip mechanism, the processor;

wherein the housing is in the form of a circuit breaker, and the power distributor is in the form of circuit breaker panel in which the circuit breaker is disposed;

wherein the equipment unit is a pump; and wherein the value of the predetermined time limit in the medium flow condition is higher than in the low flow condition, and the value of the predetermined time limit in the high flow condition is higher than in the medium flow condition.

14. The system of claim 13, wherein the power distributor is an electrical distribution board.

15. The system of claim 13, wherein the pump is a well pump, a chemical pump, or a fuel pump.

16. A method comprising:

monitoring, by a sensor housed in a housing, a current flow to an equipment unit;

tracking, by a processor, a current flow time that the current flow is being supplied to the equipment unit;

determining if a fill condition is one of a low flow condition or a high flow condition;

retrieving, by the processor from a memory, a logic program associated with the fill condition and that includes a predetermined time limit for the fill condition;

interrupting, by a trip mechanism housed in the housing, the current flow when the current flow time has reached a predetermined time limit;

wherein the housing is in the form of a circuit breaker and is disposed in a circuit breaker panel; and wherein the value of the predetermined time limit in the high flow condition is higher than in the low flow condition.

17. The method of claim 16, wherein a value of the predetermined time limit is based on at least one condition.

* * * * *